United States Patent
Gohil

(10) Patent No.: US 9,074,321 B2
(45) Date of Patent: Jul. 7, 2015

(54) FIBROUS PULP AND USE THEREOF IN A COMPOSITE

(71) Applicant: E I DU PONT DE NEMOURS AND COMPANY, Wilmington, DE (US)

(72) Inventor: Rameshchandra M Gohil, Newark, DE (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 0 days.

(21) Appl. No.: 14/034,662

(22) Filed: Sep. 24, 2013

(65) Prior Publication Data

US 2015/0083355 A1 Mar. 26, 2015

(51) Int. Cl.

| | | |
|---|---|---|
| *D21H 17/55* | (2006.01) | |
| *D21H 17/68* | (2006.01) | |
| *C08K 3/34* | (2006.01) | |
| *C08K 7/10* | (2006.01) | |
| *C08L 21/00* | (2006.01) | |
| *C08L 77/10* | (2006.01) | |
| *B60C 15/06* | (2006.01) | |
| *B60C 1/00* | (2006.01) | |
| *C08J 3/21* | (2006.01) | |
| *C08J 5/04* | (2006.01) | |
| *C08K 7/02* | (2006.01) | |

(52) U.S. Cl.
CPC .............. *D21H 17/55* (2013.01); *B60C 15/06* (2013.01); *B60C 1/00* (2013.01); *C08J 3/212* (2013.01); *C08J 5/046* (2013.01); *C08K 3/346* (2013.01); *C08K 7/02* (2013.01); *C08L 21/00* (2013.01); *C08L 77/10* (2013.01)

(58) Field of Classification Search
USPC ........ 152/209.1, 209.4, 209.5, 905, 451, 458, 152/525, 537, 547, 564; 474/237, 263, 264; 198/844.1, 847
See application file for complete search history.

(56) References Cited

U.S. PATENT DOCUMENTS

| | | |
|---|---|---|
| 3,094,511 A | 6/1963 | DuPont |
| 3,354,127 A | 11/1967 | DuPont |
| 3,673,143 A | 6/1972 | Bair et al. |
| 3,767,756 A | 10/1973 | Blades |
| 3,819,587 A | 6/1974 | Kwoleck |
| 3,869,429 A | 3/1975 | Blades |
| 3,869,430 A | 3/1975 | Blades |
| 4,172,938 A | 10/1979 | Mera et al. |
| 4,228,118 A | 10/1980 | Wu et al. |
| 4,276,348 A | 6/1981 | Wu et al. |
| 4,344,908 A | 8/1982 | Smith et al. |
| 4,457,985 A | 7/1984 | Harpell et al. |
| 4,514,541 A | 4/1985 | Frances |
| 4,533,693 A | 8/1985 | Wolfe et al. |
| 4,703,103 A | 10/1987 | Wolfe et al. |
| 4,772,678 A | 9/1988 | Sybert et al. |
| 4,847,350 A | 7/1989 | Harris |
| 4,871,004 A * | 10/1989 | Brown et al. ............... 152/209.4 |
| 5,089,591 A | 2/1992 | Gregory et al. |
| 5,276,128 A | 1/1994 | Rosenberg et al. |
| 5,674,969 A | 10/1997 | Sikkema et al. |
| 8,211,272 B2 | 7/2012 | Levit et al. |
| 2013/0052116 A1* | 2/2013 | Barney et al. ................. 423/331 |
| 2014/0364260 A1* | 12/2014 | Takahashi et al. ............ 474/263 |

OTHER PUBLICATIONS

"Kevlar® Aramid Fiber Technical Guide", [online], E. I. du Pont de Nemours and Company, no date [retrieved on Jan. 3, 2015], Retrieved from the Internet: <URL: http://www.dupont.com/content/dam/dupont/products-and-services/fabrics-fibers-and-nonwovens/fibers/documents/Kevlar_Technical_Guide.pdf>.*

"Filler Minerals Reference, A Guide to Filler Properties and Uses," Information Sheet [online] R.T. Vanderbilt Company, Inc. 2008 [retrieved on Jan. 20, 2011], Retrieved from the Internet: <URL: http://www.rtvanderbilt.com/VR703forweb.pdf>.*

Carbon Black MSDS, Chemical Book, [online], No date, , [retrieved on Jan. 2, 2015], Retrieved from the Internet: <URL: http://www.chemicalbook.com/ProductMSDSDetailCB3109508_EN.htm>.*

"Density of Polymers", Information Sheet, [online], Scientific Polymer Products, Inc., 2013, [retrieved on Jan. 2, 2015], Retrieved from the Internet: <URL: http://scientificpolymer.com/density-of-polymers-by-density/.>.*

"Densities of Miscellaneous Solids", The Engineering Toolbox, [online], No date, 5 pages, [retrieved on Jan. 2, 2015], Retrieved from the Internet: <URL: http://www.engineeringtoolbox.com/density-solids-d_1265.html>.*

* cited by examiner

*Primary Examiner* — Dennis Cordray
(74) *Attorney, Agent, or Firm* — Andrew G. Golian

(57) ABSTRACT

A composition comprises (i) an elastomer, (ii) from 1 to 5 volume % of fibrous pulp, the pulp having a specific surface area of from 7 to 11 sq.m./g and the fiber having a fiber length of from 0.5 to 1.1 mm, a tensile modulus of from 2.5 to 130 GPa, and a tensile strength of from 1 to 3 GPa, and (iii) from 5 to 14 volume % of yield-strain promoter in the form of fibers, needles, powder or platelets, wherein the composition has a yield strain of at least 70%, an elongation at break of at least 200%, and a yield stress of at least 4 MPa.

5 Claims, No Drawings

FIBROUS PULP AND USE THEREOF IN A COMPOSITE

BACKGROUND

1. Field of the Invention

This invention pertains to a composition that may be a component of a compound used to make mechanical rubber goods such as tires and belts. The invention is particularly suited for use in applications where a high strain environment is encountered.

2. Description of Related Art

U.S. Pat. No. 4,514,541 to Frances pertains to a particulate elastomeric composition having a density ratio of 0.1 to 0.4 comprising 5-75% by weight of an elastomer, 15-65% by weight of a filler and 10-60% by weight of aramid pulp and a solution process for its preparation. The composition is useful as a masterbatch for the introduction of aramid pulp into elastomeric articles.

U.S. Pat. No. 8,211,272 to Levit and Amma relates to para-aramid pulp including meta-aramid fibrids for use as reinforcement material in products including for example friction materials, fluid sealing materials, and papers. The invention further relates to processes for making such pulp.

There is an ongoing need to have rubber-fibrous pulp composites that have a yield strain of at least 70%, a yield stress of at least 4 MPa and a percentage elongation of at least 200% or even 300%. The use of such composites in high strain tires is highly desirable.

Previous attempts to achieve this by using higher aramid pulp concentrations, fiber dispersing agents, and interface modifiers led to decreased yield strain. Ming et. al. (J. Appl. Polymer Sci. 120, 1439, 2011) studied composites made using different types of rubber, Kevlar® fiber, and fibrillar silica. Their results showed a yield strain of less than 50%.

SUMMARY OF THE INVENTION

This invention pertains to a composition comprising:
(i) an elastomer,
(ii) from 1 to 5 volume % of fibrous pulp, the pulp having a specific surface area of from 7 to 11 sq.m./g and the fiber having a fiber length of from 0.5 to 1.1 mm, a tensile modulus of from 6 to 130 GPa, and a tensile strength of from 1 to 3 GPa, and
(iii) from 5 to 14 volume % of yield-strain promoter in the form of fibers, needles, powder or platelets,
wherein the composition has a yield strain of at least 70%, an elongation at break of at least 200%, and a yield stress of at least 4 MPa.

DETAILED DESCRIPTION

Elastomer

As used herein, the terms "rubber" and "elastomer" may be used interchangeably, unless otherwise provided. The terms "rubber composition", "compounded rubber" and "rubber compound" may be used interchangeably to refer to "rubber which has been blended or mixed with various ingredients and materials" and such terms are well known to those having skill in the rubber mixing or rubber compounding art.

The elastomers of the present invention include both natural rubber, synthetic natural rubber and synthetic rubber. Synthetic rubbers compounds can be any which are dissolved by common organic solvents and can include, among many others, polychloroprene and sulfur-modified chloroprene, hydrocarbon rubbers, butadiene-acrylonitrile copolymers, styrene butadiene rubbers, chlorosulfonated polyethylene, fluoroelastomers, polybutadiene rubbers, polyisoprene rubbers, butyl and halobutyl rubbers and the like. Natural rubber, styrene butadiene rubber, polyisoprene rubber and polybutadiene rubber are preferred. Mixtures of rubbers may also be utilized.

Short Fiber

The short fiber reinforcement which has a fiber length of from 0.5 to 1.1 mm and a specific surface area of from 7 to 11 sq.m./g may be in the form of floc or pulp. Pulp dispersed in water is a preferred form. The fiber is present in an amount of from 1 to 5 volume %, more preferably from 1.5 to 3 volume %.

Suitable fibers are those having a specific tensile modulus of from 6 to 130 GPa and a specific tensile strength from 1 to 3 GPa. The fiber may be glass, carbon, cellulosic, aromatic polyamide, aromatic copolyamide, aliphatic polyamide, polyimide, polyester, polyolefin, or polyazole. Blends of different fibers may be used. Some fibers may be in the form of nanotubes. Both single-wall and multi-wall nanotubes are suitable.

When the polymer is polyamide, in some embodiments, aramid is preferred. The term "aramid" means a polyamide wherein at least 85% of the amide (—CONH—) linkages are attached directly to two aromatic rings. Suitable aramid fibers include Twaron®, Sulfron®, Technora® all available from Teijin Aramid, Heracon™ from Kolon Industries Inc. or Kevlar® available from DuPont. Aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

In some embodiments, the preferred aramid is a para-aramid. One preferred para-aramid is poly (p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether. Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide such as is prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

Examples of aliphatic polyamides are polyamide-6; polyamide-6,6; polyamide-6,10; polyamide-6,12; polyamide-11; polyamide-12.

When the fiber is polyolefin, in some embodiments, polyethylene or polypropylene is preferred. Polyolefin fibers can only be used when the processing temperatures required to compound the fiber and elastomer, to calendar or extrude the compound or to cure the compound in the tire assembly is less than the melting point of the polyolefin. The term "polyethylene" means a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultraviolet screening agents, colorants and the like which are commonly incorporated. Such polyethylenes are commonly known as extended chain polyethylene (ECPE) or ultra high molecular weight polyethylene (UHMWPE). Preparation of polyethylene fibers is discussed in U.S. Pat. Nos. 4,478,083, 4,228,118, 4,276,348 and 4,344,908. High molecular weight linear polyolefin fibers are commercially available. Preparation of polyolefin fibers is discussed in U.S. Pat. No 4,457,985.

In some embodiments, polyazole fibers are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures, such as those described in or derived from U.S. Pat. Nos. 4,533,693, 4,703,103, 5,089,591, 4,772,678, 4,847,350, and 5,276,128.

Preferred polybenzazoles include polybenzimidazoles, polybenzothiazoles, and polybenzoxazoles and more preferably such polymers that can form fibers having yarn tenacities of 30 grams per denier (gpd) or greater. In some embodiments, if the polybenzazole is a polybenzothioazole, preferably it is poly (p-phenylene benzobisthiazole). In some embodiments, if the polybenzazole is a polybenzoxazole, preferably it is poly (p-phenylene benzobisoxazole) and more preferably the poly (p-phenylene-2,6-benzobisoxazole) called PBO.

Preferred polypyridazoles include polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. One preferred poly (pyridobisozazole) is poly(1,4-(2,5-dihydroxy)phenylene-2, 6-pyrido[2,3-d:5,6-d']bisimidazole which is called PIPD. Suitable polypyridazoles, including polypyridobisazoles, can be made by known procedures, such as those described in U.S. Pat. No. 5,674,969.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. The term "polyester" as used herein also includes copolymers (such as block, graft, random and alternating copolymers), blends, and modifications thereof.

In some embodiments, the preferred polyesters include poly (ethylene terephthalate), poly (ethylene naphthalate), and liquid crystalline polyesters. Poly (ethylene terephthalate) (PET) can include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The poly (ethylene terephthalate) can be obtained by known polymerization techniques from either terephthalic acid or its lower alkyl esters (e.g. dimethyl terephthalate) and ethylene glycol or blends or mixtures of these. Another potentially useful polyester is poly (ethylene napthalate) (PEN). PEN can be obtained by known polymerization techniques from 2,6 napthalene dicarboxylic acid and ethylene glycol. Another suitable polyester is polybutyleneterephthalate.

Liquid crystalline polyesters may also be used in the invention. By "liquid crystalline polyester" (LCP) herein is meant polyester that is anisotropic when tested using the TOT test or any reasonable variation thereof, as described in U.S. Pat. No. 4,118,372. One preferred form of liquid crystalline polyesters is "all aromatic"; that is, all of the groups in the polymer main chain are aromatic (except for the linking groups such as ester groups), but side groups which are not aromatic may be present.

E-Glass is a commercially available low alkali glass. One typical composition consists of 54 weight % $SiO_2$, 14 weight % $Al_2O_3$, 22 weight % CaO/MgO, 10 weight % $B_2O_3$ and less then 2 weight % $Na_2O/K_2O$. Some other materials may also be present at impurity levels.

S-Glass is a commercially available magnesia-alumina-silicate glass. This composition is stiffer, stronger, more expensive than E-glass and is commonly used in polymer matrix composites.

Carbon fibers are commercially available and well known to those skilled in the art. In some embodiments, these fibers are about 0.005 to 0.010 mm in diameter and composed mainly of carbon atoms.

Cellulosic fibers can be made by spinning liquid crystalline solutions of cellulose esters (formate and acetate) with subsequent saponification to yield regenerated cellulosic fibers.

Yield-Strain Promoter

A yield-strain promoter is an additive that is capable of increasing yield strain of a composite and normally comprises from 5 to 14 volume % of the composition. In some embodiments, the yield strain promoter comprises from 6 to 13 volume % or even 8 to 12 volume % of the composition. The yield-strain promoter extends the neck region of the stress-strain curve increasing the onset of strain hardening thus increasing the percentage elongation-at-break and stress-at-break. Preferred forms of yield-strain promoter are fibers, needles, powder or platelets. Suitable yield-strain promoter materials are clay, silica, talc, carbon black, p-aramid powder, cross-linked polymeric powder or polymeric fiber having a modulus of from 2.5 to 130 GPa. Blends of these materials may also be used. Examples of clays are magnesium silicate such as sepiolite and phyllosilicate, such as montmorillonite or attapulgite.

Mechanical Properties of the Composition

The composition has a yield strain of at least 70%, an elongation-at-break of at least 200% or even 300% and a yield stress of at least 4 MPa. In some embodiments, the composition has a yield strain of at least 80% or even has a yield strain of at least 95%.

Use of the Composition

The composition of this invention may be used in a number of elastomeric compositions to make components for tires, conveyor belts, power transmission belts and other mechanical rubber goods. A convenient means to provide the composition is in the form of an elastomeric premix such as Engineered Elastomer, available from E. I. du Pont de Nemours and Company, Wilmington, Del. (DuPont). Technical Bulletins entitled Kevlar® Engineered Elastomer—Compound Development Guide and Processing Guide provide further information on this technology.

TEST METHODS

The mechanical properties of the composite were measured according to ASTM D412-06A (reapproved 2013).

EXAMPLES

The following examples are given to illustrate the invention and should not be interpreted as limiting it in any way. All parts and percentages are by volume percent unless otherwise indicated. Examples prepared according to the current invention are indicated by numerical values. Control or Comparative Examples are indicated by letters. Data and test results relating to the Comparative and Inventive Examples are shown in Tables 1 to 2.

Materials used in the following examples were: Kevlar® pulp was merge 1F361 from DuPont. Kevlar® Engineered Elastomer (KEE) was merge 1F722 also supplied by DuPont. The KEE was mixed with differing amounts of natural rubber to give the volume % pulp as shown in the examples. Sepiolite was grade Pangel S9 available from Tolsa, Suwanee, Ga. Attapulgite was grade ActiGel® 208 available from Active Minerals International, Cockeysville, Md. Nylon SF at 3 denier per filament was obtained from MiniFibers Inc., Johnson City, Tenn. Montmorillonite was Cloisite® material from Southern Clay Products, Gonzales, Tex.

Laboratory Preparation of Pulp-Elastomer Samples 36.4 g of Kevlar Pulp (DuPont 1F361; dry wt. 20.00 g) was immersed in 1000 g of warm water. The resulting solution was mixed in a high shear mixer for 15 minutes at room temperature. 10.6 g of the dispersant Alcogum 6940 (dry wt. 1.03 g) and 0.62 g of the dispersant Alcogum SL-70 (dry wt. 0.10 g) were added to the mixture. The resulting solution was mixed at a high shear mixer for 15 minutes at room temperature. 108.9 g of latex elastomer, 2.04 g of the antioxidant Aquamix 125 and 2.02 g of the antioxidant Aquamix 549 (dry wt. 0.31 g) were added to the mixture. The resulting solution was mixed in a high shear mixer for 15 minutes at room temperature. This product was recovered from water by complete de-watering.

The de-watering was carried out by adding acetic acid and calcium chloride until the material coagulated into a milky dough appearance. The material was then transferred to a roll mill and the water was squeezed out. The sample was removed and air dried and then was transferred to a vacuum oven (80-90 C) overnight for further drying. The dried product was cut into small pieces. This end product is termed "KEE 1F722" when it is produced commercially, when it is produced in the lab it is called "Lab EE".

Melt mixing of "KEE" or "LAB EE" with all additives (antioxidants, curatives, accelerators) was carried out in a Brabender below 96° C. for 10 minutes at 110-120 RPM. The dried ingredients were added to the Brabender blender and the blade speed increased from 10 rpm for loading up to 100-120 rpm. Blending was stopped if the temperature exceeded 96° C. and after cooling to 70° C., mixing was resumed. After ten minutes, curatives or cross-linking additives (stearic acid, zinc oxide, sulfur) were added and mixing continued for an additional one minute. At the end of the mixing time, RPM was reduced and after cooling the product was recovered and cut into small pieces. These pieces were sandwiched between steel plates and introduced into a preheated (160 C) hydraulic press and pressed at 10000 psi and held for 3 minutes for softening. The sample was then pressed at 25000 psi for 5 minutes. The sample was cooled down, the film (10 mil) was removed and dogbone shapes were punched out for mechanical strength testing on an Instron universal test machine.

A series of experiments as shown in Table 1 were carried out to show that merely adjusting the composition by the amount of pulp added to the rubber is insufficient to achieve a yield strain greater than 70%.

All pulp and strain-promoter concentrations are expressed as volume percent except for Comparative Example E where the pulp level is by weight percent of pulp mixture.

TABLE 1

| Example | Composition of Pulp in EE (Vol %) | Young's Modulus (MPa) | Yield Stress (MPa) | Yield Strain (%) | Elongation at Break (%) | Stress at Break (%) |
|---|---|---|---|---|---|---|
| A | 1.3 (=2.5 phr) | 5.5 | 3.3 | 68 | 602 | 19.5 |
| B | 2.6 (=5 phr) | 5.8 | 5.8 | 62 | 440 | 11.6 |
| C | 3.9 (=7.5 phr) | 7.7 | 7.7 | 55 | 314 | 11.0 |
| D | No pulp | 0.5 | 0.5 | 46 | 696 | 17.3 |

Increasing amounts of pulp increases the yield stress and decreases yield strain, elongation at break and stress at break.

The influence of adding an inorganic strain promoter is shown by the examples in Table 2.

TABLE 2

| Ex. | Composition of Pulp and r Strain Promote in EE (Vol %) | Young's Modulus (MPa) | Yield Stress (MPa) | Yield Strain (%) | Elongation at Break (%) | Stress at Break (%) |
|---|---|---|---|---|---|---|
| E | 23 weight % pulp, No promoter | 6.2 | 5.2 | 65 | 330 | 9.5 |
| F | No pulp, 10% Kevlar ® powder | 2.2 | 1.2 | 80 | 575 | 16.5 |
| 1 | 2.6% pulp, 10% sepiolite | 15.0 | 6.2 | 95 | 364 | 14.0 |
| 2 | 1.8% pulp, 10% sepiolite | 4.9 | 4.9 | 102 | 320 | 12.2 |
| 3 | 2.6% pulp, 7% sepiolite | 5.6 | 4.9 | 89 | 235 | 7.9 |
| 4 | No pulp, 10% sepiolite | 16.7 | 5.2 | 88 | 520 | 20.4 |
| 5 | 2.6% pulp, 10% attapulgite | 13.8 | 7.6 | 98 | 426 | 16.6 |
| 6 | 1.8% pulp, 10% attapulgite | 4.8 | 4.8 | 112 | 423 | 14.2 |
| 7 | 2.6% pulp, 7% attapulgite | 5.6 | 5.9 | 105 | 277 | 10.3 |
| 8 | 2.6% pulp, 10% nylon SF, 0.57% montmorillonite clay | 11.1 | 6.1 | 150 | 235 | 6.9 |
| 9 | 2.6% pulp, 10% nylon SF | 9.7 | 6.4 | 140 | 310 | 7.9 |
| 10 | 2.6% pulp, 10% montmorillonite clay | 6.8 | 2.7 | 90 | 270 | 5.25 |

TABLE 2-continued

| Ex. | Composition of Pulp and r Strain Promote in EE (Vol %) | Young's Modulus (MPa) | Yield Stress (MPa) | Yield Strain (%) | Elongation at Break (%) | Stress at Break (%) |
|---|---|---|---|---|---|---|
| 11 | 2.6% pulp, 10% Kevlar ® powder | 7.2 | 3.1 | 80 | 505 | 15.2 |

Comparative Example E has a yield strain of 65%, whereas the corresponding value for Examples 1 to 7 containing strain promoter are from 88% to 112%, a significant improvement. The data in Table 2 shows that yield strain increased to a range of from 88% to 150%.

What is claimed is:

1. A composition comprising:
   (i) an elastomer,
   (ii) from 1 to 5 volume % of fibrous pulp which is p-aramid, the pulp having a specific surface area of from 7 to 11 sq.m./g and the fiber having a fiber length of from 0.5 to 1.1 mm, a tensile modulus of from 2.5 to 130 GPa, and a tensile strength of from 1 to 3 GPa, and
   (iii) from 5 to 14 volume % of yield-strain promoter which is clay in the form of fibers or needles,
   wherein the composition has a yield strain of at least 95%, an elongation at break of at least 200%, and a yield stress of at least 4 MPa.

2. The composition of claim 1, wherein the yield-strain promoter comprises from 6 to 13 volume % of the composition.

3. The composition of claim 2, wherein the yield strain promoter comprises from 8 to 12 volume % of the composition.

4. A tire, conveyor belt or power transmission belt comprising the composition of claim 1.

5. The composition of claim 1, wherein the clay is sepiolite, attapulgite or montmorillonite.

* * * * *